Patented Oct. 21, 1941

2,259,704

UNITED STATES PATENT OFFICE 2,259,704

PROCESS FOR RESOLVING PETROLEUM EMULSIONS

Louis T. Monson, Alhambra, and William Wallace Anderson, Montebello, Calif., assignors to Petrolite Corporation, Ltd., Wilmington, Del., a corporation of Delaware No Drawing. Application May 12, 1941, Serial No. 393,132

9 Claims. (Cl. 252—336)

This invention relates primarily to the treatment of emulsions of mineral oil and water, such as petroleum emulsions, for the purpose of separating the oil from the water.

One object of our invention is to provide a novel process for resolving petroleum emulsions of the water-in-oil type, that are commonly referred to as "cut oil," "roily oil," "emulsified oil," etc., and which comprises fine droplets of naturally-occurring waters or brines dispersed in a more or less permanent state throughout the oil which constitutes the continuous phase of the emulsion, our process being particularly adapted to the resolution of crude oil emulsions of the kind obtained in connection with the treatment or the flooding of subterranean oil-bearing strata by means of aqueous agents or the like.

Another object of our invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned are of significant value in removing impurities, particularly inorganic salts, from pipeline oil.

The process which constitutes our present invention consists in subjecting a petroleum emulsion of the water-in-oil type to the action of a demulsifying agent, thereby causing the emulsion to break and separate into its component parts of oil and water or brine when the emulsion is permitted to remain in a quiescent state, after treatment, or is subjected to other equivalent separatory procedure. The demulsifying agent employed in our process consists of a mixture comprising a blown fatty oil, a sulfonated fatty body and an acylated amino-ether.

The acylation reaction employed to produce the acylated amino-ether is conducted in such a manner as to introduce an acyl radical derived from a monocarboxy detergent-forming acid. Such acids are characterized by having at least 8 carbon atoms and not more than 32 carbon atoms, and are exemplified by fatty acids, naphthenic acids, abietic acids, or the like, or by simple modifications thereof which do not detract from the ability of the acid to combine with alkali to produce soap or soap-like materials. For instance, hydrogenated oleic acid, chlorinated naphthenic acid, or brominated abietic acid will form such detergent-like bodies with the same ease as the parent materials themselves. The oxidized acids obtained by blowing or oxidation of the acids or esters are satisfactory. Such acids have frequently been referred to collectively in the art as monocarboxy detergent-forming acids. Needless to say, the acylation need not be conducted by means of the acid itself, but may be conducted by means of any compound of the acid which contains the acyl radical; for instance, an ester, an amide, an anhydride, an acyl chloride, etc.

Common polyhydric alcohols include the glycols and glycerols. These polyhydric alcohols are characterized by the ease with which two or more molecules combine with the elimination of water to form polyglycols, polyglycerols, or the like. These latter compounds are sometimes referred to as ether alcohols, because the typical ether linkage, carbon-oxygen-carbon, appears at least once in such compounds. It is known that certain hydroxyamines, particularly alkanolamines containing alkanol radicals, enter into the same kind of reaction with the formation of a hydroxylated amino-ether. Possibly, the commonest example of an alkanolamine is an ethanolamine, particularly diethanolamine and triethanolamine. It may be well to point out that one ingredient or component of the compounds herein contemplated as demulsifying agents is derived from basic compounds, i. e., compounds in which the basicity approximates that of the parent hydroxyamine. Such basic amines are characterized by the fact that there is no aryl group directly attached to an amino nitrogen group, unless there be present at least one other amino radical capable of contributing a basic quality. In other words, a hydrogen atom attached to an amino nitrogen atom may remain as such, or may be replaced by an alkyl radical, an alicyclic radical, or an aralkyl radical, or there may be present a hydroxy alkyl radical, a hydroxy alicyclic radical, or a hydroxy aralkyl radical directly attached to the amino nitrogen atom. Furthermore, such hydroxy hydrocarbon radicals may be acylated with lower aliphatic acids containing at least two carbon atoms and not more than 7 carbon atoms. Such acids include acetic acid, butyric acid, heptoic acid, etc. In the event that an amino nitrogen atom appears in which an aryl radical is directly attached to said amino nitrogen atom, as in the case of phenyl diethanolamine, then the presence of such non-basic amino nitrogen atom must be ignored and the compound must contain at least one amino nitrogen atom of a basic character elsewhere in the molecule. Other similar aryl alkanolamines, such as diphenyl ethanolamine, naphthyldiethanolamine, phenyldipropanolamine, etc. may be used, subject to the above-mentioned provision.

In the following table of compounds, the letter T indicates an amino hydrogen atom, or any one of the substituents which have been suggested as satisfactory to replace an amino hydrogen atom. The following table is submitted purely by way of illustration and indicates only a small portion of the various materials which may be acylated with a detergent-forming monocarboxy acid to provide a component of the demulsifying agents of the kind employed in the present process:

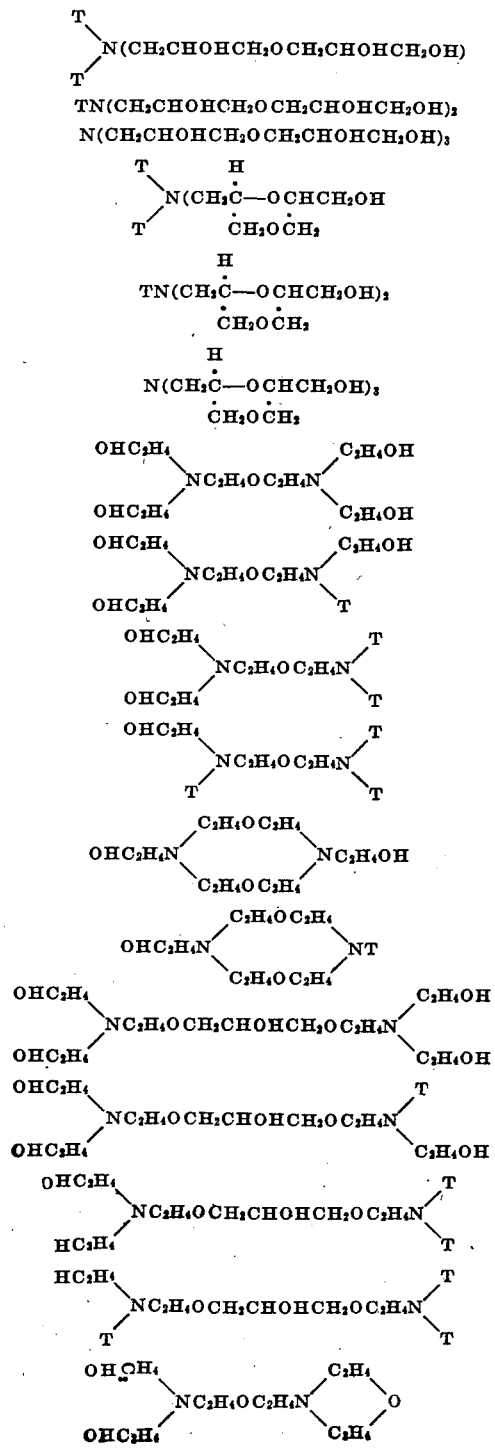
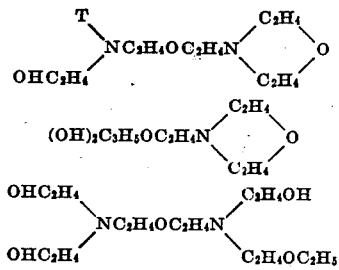

In the above table, it is understood that where the radical $C_2H_4$ occurs, it may be replaced by any other suitable radical, such as a $C_3H_6$, $C_4H_8$ radical, etc. Furthermore, it may be replaced by a residue from a cyclohexyl radical, or a residue from a benzyl radical or the like. Similarly, where the glycerol radical appears, a homolog may be substituted instead, as, for example, beta-methyl glycerol or the tetrahydroxyl derivative thereof. It is unnecessary to differentiate between isomeric forms; and in some instances, one may have polymeric forms containing a large number of residues derived from polyhydric alcohols or hydroxyamines, and of such a kind that there are present perhaps 20, 30, 40, or even 50 residues from the parent material or materials which contribute to the formation of the final molecule. Continuous etherization is considered as being polymerization, for purposes of convenience. Such polymers may be considered a repetition of the monomer, taken any convenient number of times—for instance, two to twenty times. It is also to be noted that the molecule may be joined by more than one ether linkage in parallel. As previously stated, phenyl diethanolamine or similar compounds may enter into the final molecule. Similarly, morpholine or ethanol morpholine may be employed. Morpholine may be considered as contributing the basic amino nitrogen atom. In each and every instance the compound is characterized by having present at least one basic nitrogen atom, i. e., a nitrogen atom unattached to any aryl radical and at least one hydroxylated hydrocarbon radical generally derived from an alkanolamine or from a glycerylamine, such as monoglycerylamine, diglycerylamine, or triglycerylamine.

As to the manufacture of such compounds, one need only point out that some of them are well known compositions of matter. Others can be produced, if desired, in the same manner employed to produce those which are well known. One method of producing such compounds is to heat the desired products under suitable conditions, so as to cause dehydration to take place. Another method is to treat the selected amine with a product such as an alkylene oxide, including ethylene oxide, or with a product such as glycidol. Other methods involving dehydration in presence of an acidic agent, for instance, dehydration of two moles of diethanolamine so as to produce the ether type compound instead of morpholine, may be employed. It is possible that some of the types indicated above, like other organic compounds, are difficult to prepare, but their derivatives can be prepared more readily. In other words, since an acylated product is desired, it is feasible, in some instances, to prepare the acylated product by uniting a partially esterified polyhydric alcohol with a partially esterified alkanolamine, or by use of an equivalent method. This particular method of producing the desired type of chemical compound will be discussed subsequently.

Attention is directed to the co-pending application for patent, Serial No. 273,278, of Melvin De Groote and Bernhard Keiser, filed May 13, 1939. This particular co-pending application teaches a convenient method for making some of the compounds of the kind previously indicated. The said method involves essentially the conversion of an ethanolamine or the like, such as triethanolamine, into a mono- or dialcoholate, and the reaction of the alcoholate with a halohydrin, such as glycerol chlorhydrin or glycerol dichlorhydrin. The alcoholates may be indicated by the following formulae:

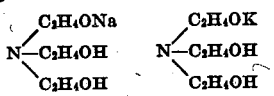

Such alcoholates react so as to liberate the alkali metal halide, such as sodium chloride or potassium chloride. Said co-pending application illustrates, for example, the manufacture of materials of the following type by means of such reaction:

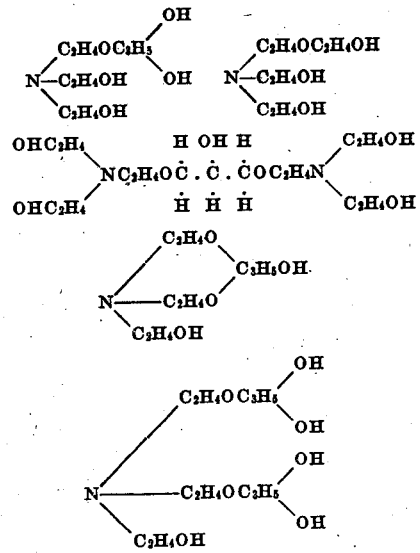

It is to be noted that the chlorhydrin involved may of itself be acylated, and thus compounds are derivable which are characterized by the presence of an acyl radical obtained from acids having either less than 8 carbon atoms or more than 8 carbon atoms. The following excerpt is taken verbatim from said aforementioned application:

"It has been previously pointed out that one may obtain acylated derivatives of the amino ethers by use of the acylated alcoholate derived by utilization of metallic sodium or potassium or the like. In such compounds the acyl radical is attached directly to the tertiary amine residue or radical. However, if one employs an esterified chlorhydrin, i. e., the chlorhydrin derived from monoacetin, monostearin, monoabietin, mononaphthenin, or the like, one obtains a chlorhydrin of the following type:

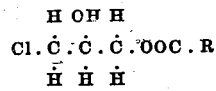

in which R.CO is the acyl radical derived from R.COOH, which represents an acid of the kind previously described. By employing such acylated halohydrin or chlorhydrin, one can use reactants which include reactions of the following composition:

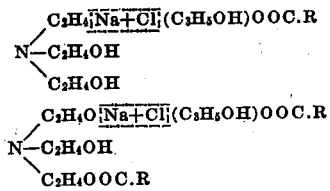

The above reactions can only be conducted in the absence of free alkali."

The following example for preparing a hydroxy amino-ether is taken verbatim from said co-pending application Serial No. 273,278:

"100 pounds of commercial triethanolamine containing 2½% monoethanolamine and 15% diethanolamine, are treated with 135 pounds of a 60% solution of caustic soda (i. e., 80½ lbs. NaOH dissolved in 53 lbs. of water), so as to yield a pasty or semi-solid mass containing substantially no free or relatively little free alkali. The wet mass is then reacted with extreme care, as previously noted, with commercial glycerol monochlorhydrin. After completion of reaction, the sodium chloride formed is separated by filtration and hydraulic pressure. The final product represents a compound of technical purity and has the following composition:

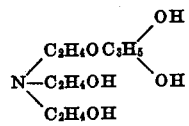

In the hereto appended claims no reference is made to the fact that the alcoholate is employed in substantial absence of alkali, because it is deemed unnecessary to indicate that this condition is the most desirable. The objection to an excess of alkali is the destruction of the chlorhydrin and the formation of a polyhydric alcohol or the like, which appears in the completed product. Naturally, there is no objection to small amounts of excess alkali whose significance is not appreciable. It is to be noted in the claims that no reference is made to separation of the alcoholate from water, excess alkali, unreacted amine, etc., which may be present, although as previously indicated, such separatory procedure may be followed if desired."

Having prepared a hydroxy amino-ether of the kind previously described, the second step in the manufacture of the demulsifying agent employed in our present process, is to acylate such a product so as to introduce an acyl radical derived from a detergent-forming monocarboxy acid. For purposes of convenience, such mono-carboxy acid may be indicated by the formula R'.COOH and the acyl group by R'.CO. It has already been indicated that acylation may be conducted by use of the acid itself, or by use of any suitable compound containing the acyl radical in labile form.

Attention is directed to U. S. Patents Nos. 2,154,422 and 2,154,423, to De Groote, Keiser and Blair, both dated April 18, 1939. Both of said patents are concerned with products derived by esterification between intermediate amines containing an alcoholic hydroxy group and phthalic anhydride. It is necessary in the instances described in said patents that an alcoholic hydroxyl radical be present in reaction with phthalic anhydride. Insofar that the acylated aminoethers herein contemplated as components of demulsifying agents need not be esterified with phthalic anhydride or the like, it is apparent that no alcoholic hydroxyl radical need be present, and that acyl radicals may be introduced so that there is no residual hydroxyl radical attached either to a hydrocarbon radical or to an acyl radical, such as a hydroxyl radical which is part of a ricinoleyl radical. Furthermore, it is apparent that even when acylation is accomplished with an acid having no hydroxyl radicals, for instance, stearic acid, oleic acid, naphthenic acid, or the like, then, in that event, one may acylate a hydroxy amino-ether having only one free hydroxyl radical. A person skilled in the art will readily understand how to employ the methods and compounds described in said two aforementioned patents to prepare acylated derivatives from hydroxy amino-ethers of the kind above described and the selected detergent-forming monocarboxy acid compound.

Said patents indicate the following amines which may be employed: Diethanolamine, monoethanolamine, ethyl ethanolamine, methyl ethanalomaine, propanolamine, dipropanolamine, propyl propanolamine; cyclohexanolamine, dicyclohexanolamine, cyclohexylethanolamine; cyclohexylpropanolamine, benzyl ethanolamine, benzyl propanolamine, pentanolamine, hexanolamine, octyl ethanolamine, octadecyl ethanolamine, cyclohexanol ethanolamine; triethanolamine, diethanolalkylamines, such as diethanolethylamine, diethanol propylamine; diethanol methylamine, tripropanolamine, dipropanol methylamine, cyclohexanol diethanolamine, dicyclohexanol ethanolamine, cyclohexyl diethanolamine, dicyclohexyl ethanolamine, dicyclohexanol ethylamine, benzyl diethanolamine, dibenzyl ethanolamine, benzyl dipropanolamine, tripentanolamine, trihexanolamine, ethyl hexyl ethanolamine, octadecyl diethanolamine, polyethanolamine, mono-, di-, and triglycerylamine, etc.

Attention is also directed to the two aforementioned patents to the extent that they disclose and describe various glycerylamines and the method of manufacturing the same. Such methods obviously are applicable to derivatives of the kind previously mentioned, such as beta methyl glycerol, beta propyl glycerol, beta ethyl glycerol, etc., as well as derivatives of the tetrahydroxyl compounds obtainable therefrom.

It has been previously pointed out that this type of component of the chemical compounds or demulsifying agents employed in the present process need not necessarily be manufactured by first preparing the hydroxy amino-ether, and subsequently acylating the same. As a matter of fact, in many instances it is more convenient to acylate the desired polyhydric alcohol or the desired hydroxy amine, and then combine the two acylated molecules or acylate one type of compound and combine with the unacylated molecule of the other type. Indeed, an examination of what has been said previously and an examination of the method suggested hereinafter indicates that one can proceed to produce a compound in which the acylated radical derived from the detergent-forming radical is produced at whatever point is desired. In other words, it may be introduced only in one or more hydroxy amino residues which are present; or the acyl radical may be introduced only in one or more polyhydric alcohol residues which are present; or it may be introduced both into the hydroxyamine residues which are present and into the polyhydric alcohol residue which is present. As previously pointed out, if desired, the acyl radical may be introduced more than once into the same hydroxyamino residue, or into the polyhydric alcohol residue, provided there are available sufficient alcoholic hydroxyls for such combination.

Acylation, of course, is identical with esterification for the purposes of the present description. In other words, instead of replacing the hydrogen atom of a hydroxyl group by an acyl radical, one can assume that the complete hydroxyl radical has been replaced by an oxyacyl radical, i. e., a fatty acid radical; and thus, the product may be referred to as esterified. Using such nomenclature, one can refer to an alkanolamine as being partially esterified with a selected detergent-forming monocarboxy acid or a polyhydric alcohol as being partially esterified. The manufacture of partially esterified alcohols, such as superglycerinated fats, is well known; and such compounds have considerable utility in the arts. Needless to say, the same method employed for producing superglycerinated fats may be employed in connection with any polyhydric alcohol and may be employed in connection with other acids instead of fatty acids, for instance, the other non-fatty detergent-forming monocarboxy acids; such as abietic acid, naphthenic acid, and the like. In view of this fact, no description is necessary as to the method of preparing partially esterified polyhydric alcohols from detergent-forming acids of the kind described. Furthermore, no description is necessary as to the method of preparing partially esterified alkanolamines, in view of what has been said previously, and particularly in view of the complete description of equivalent acylation procedure, which appears in the aforementioned United States Patents Nos. 2,154,422 and 2,154,423.

Reference is made to U. S. Patent No. 2,228,989, of Melvin De Groote, Bernhard Keiser, and Charles M. Blair, Jr. Said patent describes compounds obtainable by a method which comprises heating a partially esterified tertiary alkanolamine with a polyhydric alcohol to a temperature in excess of 100° C. for a period of time sufficient to cause condensation with elimination of water and the production of an ethereal reaction product. Although said patent is concerned largely with derivatives of fatty acids, needless to say, the same procedure may be applied to comparable compounds derived from naphthenic acid or abietic acid or the like. This is also true in regard to the preparation of subsequent Examples 4-10, inclusive. The following three examples appear in said patent:

*Example 1* (Example 1 of the patent).—"Commercial triethanolamine and cocoanut oil, in the proportions of 1 mole of cocoanut oil to 3 moles of triethanolamine are heated to a temperature between about 160° C. and 180° C. for about two hours. The resulting product consists mainly of the mono-fatty acid ester of triethanolamine, with minor proportions of the di-fatty acid ester, the tri-fatty acid ester, glycerin, etc. To this reaction product is added somewhat more than 2 moles of glycerin, and the resulting mixture is heated to a temperature between about 160° C. and 180° C. for about two days. If desired, a current of dry nitrogen or other inert gas may be passed through to speed up the reaction. Condensation occurs between the fatty acid ester of the triethanolamine, and the glycerin, with the production of ethereal reaction products, such as the dihydroxypropyl ether of the mono-fatty acid ester of triethanolamine and other more complex ethereal reaction products."

*Example 2* (Example 2 of the patent).—"Triglycerylamine (tri-dihydroxypropylamine) and castor oil are reacted in the proportions of 3 moles of castor oil to 2 moles of triglycerylamine, with the production of a product consisting predominantly of the diricinoleic acid ester of the triglycerylamine. The resulting mixture is further heated for a period of about two days, with condensation between the glycerin and the diricinoleic acid ester of the triglycerylamine, and the production of corresponding ethereal condensation products."

*Example 3* (Example 3 of the patent).—"Blown rapeseed oil and diethanolethylamine, in the molecular proportions of 3 moles of the amine to 1 mole of the oil, are heated together to a temperature between about 150° C. and 180° C. for about two hours, with the production of a reaction product containing a large proportion of the mono-ester of the diethanolethylamine, together with unreacted starting material, glycerin, etc. Something in excess of two moles of glycerin are added to the reaction mixture, and the resulting product is heated to about 150° C. to 180° C. for about two days, with the production of ethereal reaction products of glycerin and the mono-ester of the diethanolethylamine."

Similarly, attention is called to the U. S. Patent No. 2,228,987, of Melvin De Groote, Bernhard Keiser and Charles M. Blair, Jr. Said patent describes compounds of the kind obtainable by a method which comprises heating the triglyceride, a tertiary alkanolamine having more than one alcoholic hydroxyl radical, and a polyhydric alcohol, to a temperature in excess of 100° C. for a period of time sufficient to cause alcoholysis of a triglyceride and condensation between the resulting partially esterified alkanolamine, and partially esterified glycerine. The following examples appear in said patent:

*Example 4* (Example 1 of the patent).—"Commercial triethanolamine, cocoanut oil and glycerin in the proportions of one mole of cocoanut oil to three moles of triethanolamine and at least one mole of glycerin are heated to a temperature of between about 150° and 180° C. for a period of about fifty hours. If desired, a current of dry nitrogen may be passed through the reaction mixture. The resulting product contains a substantial and preponderating amount of the ether resulting from the condensation of the mono-fatty acid ester of triethanolamine and the mono- and di-fatty acid ester of glycerin, shown in the following formula.

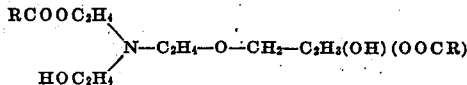

of which R represents the long carbon linked chain of the cocoanut oil fatty acids."

*Example 5* (Example 2 of the patent).—"Triglycerylamine (tri-dihydroxy-propylamine) and castor oil are reacted in the proportions of three moles of castor oil to two moles of triglycerylamine, for a period of about two hours at a temperature of around 150° to 180° C. To the product so produced, which consists predominantly of the di-ricinoleic acid ester of the triglycerylamine, is added about 50% of the monoricinoleic acid ester of glycerin, and the resulting mixture is heated to about 150° to 180° C. for about two days, with the production of mixed ethers of the di-ricinoleic acid ester of triglycerylamine and the monoricinoleic acid ester of glycerin, of the type formula:

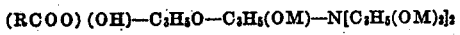

in which two of the M's represent the acyl group corresponding to ricinoleic acid and the other three represent hydrogen, and in which H represents the carbon linked chain characteristic of ricinoleic acid."

*Example 6* (Example 3 of the patent).—"Palm kernel oil and diethanolethylamine, in the molecular proportions of three moles of the amine to one mole of the palm kernel oil are heated together with one mole of a polyglycerol to a temperature between about 150° and 180° C. for about two days with the production of a reaction product containing a large proportion of the ether of the mono-fatty acid ester of diethanolethylamine and the monoglyceride corresponding to palm kernel oil, and a large proportion of the ether of the same diethanolethylamine ester and the mono-fatty acid ester of the polyglycerol."

*Example 7* (Example 4 of the patent).—"An equimolecular mixture of the mono-acetic acid ester of triethanolamine and the mono-stearic acid ester of glycerin are heated together for a period of about fifty hours, with the production of a product containing substantial amounts of the ether of the formula:

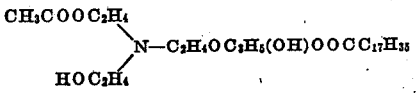

together with more complex ethereal derivatives of the amine and the monoglyceride."

*Example 8* (Example 5 of the patent).—"Commercial triethanolamine, a fatty oil and ethylene glycol in the molecular proportions of two moles of the amine to one mole of the oil to one mole of the ethylene glycol are heated to a temperature between about 150° and 180° C. for about two days with the production of a reaction product containing substantial amounts of the ether of the mono-ester of triethanolamine with the corresponding monoglyceride and the ether of the mono-ester of triethanolamine with the mono-ester of ethylene glycol."

Furthermore, reference is made to U. S. Patent No. 2,228,988, of Melvin De Groote, Bernhard Keiser and Charles M. Blair, Jr., which describes compounds obtainable by a method which comprises heating a partially esterified tertiary alkanolamine with a tertiary alkanolamine at a temperature to an excess of 100° C. for a period of time sufficient to effect condensation with the production of an ethereal reaction product. The following examples are taken from said patent:

*Example 9* (Example 1 of the patent).—"Commercial triethanolamine and cocoanut oil, in the proportions of 1 mole of cocoanut oil to 3 moles of triethanolamine, are heated to a temperature between about 150° C. and 180° C. for a period of about two days. If desired, a current of inert gas, such as dry nitrogen, may be passed through the reaction mixture to speed up the reaction. The resulting product consists mainly of the ether formed by the elimination of a molecule of water from two molecules of the mono-fatty acid ester of triethanolamine, with minor proportions of more complex ethers, ethers of the di-fatty acid ester of triethanolamine, ethers of the fatty acid esters of triethanolamine with glycerin or mono- or di-glycerides, etc."

*Example 10* (Example 2 of the patent).—"The diricinoleic acid ester of triglycerylamine is heated to a temperature between about 150° and 180° C. for about two days, with the production of a product consisting mainly of ethers such as di-dihydroxypropyl, mono-hydroxypropylamine diricinoleate ether, and more complex ethers formed by the condensation of more than two molecules of the triglycerylamine diricinoleate, etc."

*Example 11* (Example 3 of the patent).—"Diethanolamine mono-acetate is heated to a temperature between about 150° C. and 180° C. for about two days with the production of a product consisting mainly of the ether of the formula:

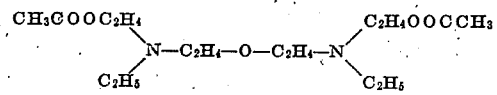

It is to be noted that reference is made to the above cited co-pending application and patents in regard to a further elaboration as to various fatty acid esters, i. e., ordinary vegetable oils, fats, and the like, which may be employed, and also as to further description of acceptable hydroxyamines and polyhydric alcohols which may be employed. It must be recognized that the materials have not lost their basicity to any great degree, as compared with the hydroxyamines from which they were originally derived. Esterification or acylation may tend to reduce the basicity to some degree, although, in some instances, it may even be increased. Such moderate changes are immaterial. The products previously described combine with water to form a base, presumably a substituted ammonium compound. Where more than one amino nitrogen atom is present, they act as a polyamine. Such compounds may combine with acetic acid, hydrochloric acid, lactic acid, nitric acid, butyric acid, phosphoric acid, oxalic acid, or any suitable organic or inorganic acid, to form salts. It is understood that references in the specification and appended claims of the present application to amines, include the basic form and the acid salts, as well as the amines themselves.

Generally speaking, it is our preference to obtain the products from amines in which there is no hydrogen atom attached to the amino nitrogen atom. In other words, our preference is to use tertiary amines, such as ethyl diethanolamine, diethyl ethanolamine, thiethanolamine, etc. Generally speaking, it is our preference to prepare the products from the tertiary amines, in which there is an alkanolamine radical present, particularly an ethanolamine radical present. Furthermore, it is our preference to employ derivatives of glycerol in forming the ether type compound. Particular attention is directed to the types of compounds as prepared according to the directions in the co-pending application and the patents previously referred to. Incidentally, we desire to point out that T, previously referred to, may represent an RCO radical directly attached to the amino nitrogen radical. In other words, the product may also be an amide. The RCO in such instances may be derived from an acid having less than 8 carbon atoms, or from a detergent-forming acid. However, in such instances the basicity of the amino radical will usually disappear in conversion into an amide; and therefore, in such instances it is usually necessary to have another amino nitrogen atom present which supplies the basicity of the molecule. Such situation is entirely analogous to the presence of an amino nitrogen atom attached to an aryl radical, as in the case of phenyl diethanolamine, previously referred to. There is no objection to any nonbasic nitrogen atom contributing part of the molecular weight in the form of an arylamine radical, or in the form of an amido radical, provided that the compound still is basic, due to the presence of some other basic amino nitrogen radical of the kind previously described.

Attention is again directed to the fact that, although the preceding eleven examples are concerned largely with derivatives of unmodified fatty acids, yet the same procedure is also applicable to modified fatty acid compounds manufactured in the manner previously indicated, to wit, so that such modifications are still convertible into soap or soap-like bodies by agency of suitable alkalies. Similarly, one can prepare compounds of abietic acid, naphthenic acid, or modified forms thereof. It is not necessary to prepare the acylated amino-ethers from esters; but if such procedure is desired, then one can first prepare esters from naphthenic acid, abietic acid, or the like, which correspond to naturally-occurring esters; for instance, one can prepare naphthenin, abietin, or the like. We particularly prefer to prepare compounds characterized by the presence of at least one, and preferably more than one, hydroxy hydrocarbon group in the final product. Reference is made to the fact that the table appearing in the early part of this application, describing a series of representative hydroxy amino-ethers, contains certain species in which the ether linkage involved combination with a monohydric alcohol. Such alcohols can vary from methyl thru octadecyl, or stearyl, and may be normal or branched. In view of this fact, it must be appreciated that the scope of the compounds contemplated as ingredients of the demulsifying agents in the present application may be derived from hydroxy amines and monohydric alcohols, as well as hydroxy amines and dihydric alcohols, or from intermolecular reactions of two or more moles of hydroxy amines. As to the manufacture of such alkyl ethers or hydroxy alkylamines, it is to be noted that they can be manufactured by means of conventional methods now employed, or by methods which involve modification of previously described methods; or they may be manufactured by the method described in French Patent No. 832,288, dated September 23, 1938, to Zschimmer & Schwarz, Chemische Fabrik Dölau.

Having obtained such alkyl ethers of hydroxy alkylamines by the method suggested in said aforementioned French Patent No. 832,288, or by any other means, one then acylates such products in the same manner previously described. As has been pointed out previously, our preference is to use fatty acids, particularly the fatty acid compounds, such as esters, because they are readily available in the form of naturally-occurring oils and fats. Among the various desirable glycerides are: castor oil, olive oil, cottonseed oil, rapeseed oil, fish oil, menhaden oil, corn oil, cocoanut oil, palm oil, palm kernel oil, linseed oil, sunflowerseed oil, teaseed oil, neat's-foot oil, etc. Our preference is that the monomeric chemical compound, exclusive of acyl radicals, shall contain less than 60 carbon atoms, and in most instances, shall contain less than 25 carbon atoms. The acylated amino-ethers used in this invention are ether mono- or polyamino bodies, i. e., they contain one or more amino nitrogen atoms. In all preferred cases, they do not contain more than five such nitrogen atoms, and most preferably, they contain two or three such nitrogen atoms.

Blown fatty oils, and particularly blown castor oil, have long been known and have been used in various arts, including the demulsification of petroleum oils. In general, they are produced by the action on a fatty oil or fatty acid of an oxygen-containing gas, commonly air, and usually at somewhat elevated temperatures. In characteristics, they range from relatively low viscosity, light colored liquids to nearly black liquids whose consistency may best be defined as semi-livery. We prefer to use blown castor oil as the preferred ingredient of this type in our reagent.

It has long been known that various animal, vegetable, and marine oils can be blown or oxidized, so as to yield materials which differ in chemical and physical properties and characteristics from the parent materials from which they were derived. The oxidation process is generally conducted by means of moist or dry air, ozone, ozonized air, or a mixture of the same. It may be conducted at atmospheric pressure, or may be conducted under increased pressures of several atmospheres or more. Oxidation may be conducted at relatively low temperatures, for instance, 100° C., or 130° C., or may be conducted at a much higher temperature. Oxidation may be conducted in absence of catalysts, or in presence of catalysts. Such catalysts may consist of metallic salts, such as cobalt or manganese oleate, or may consist of organic material, such as alpha pinene or the like. Oxidation may be conducted in a relatively short time, such as 20 hours, or may require 200 hours or more.

Patents which describe conventional blown oils or conventional methods of making various blown oils for various purposes (including in some instances, for the purpose of demulsifying crude oils), include the following:

U. S. Patent No. 1,929,399, dated October 3, 1933, to Fuchs; U. S. Patent No. 1,969,387, dated August 7, 1934, to Tumbler; U. S. Patent No. 2,023,979, dated December 10, 1935, to Stehr; U. S. Patent No. 2,041,729, dated May 26, 1936, to Seymour; and U. S. Patent No. 1,984,633, dated December 18, 1934, to De Groote and Keiser.

Insofar that the material or composition we prefer to use as a component of the demulsifying agent of our process is derived from blown castor oil, an effort will be made to describe said material or compound in considerable detail. Mild oxidation of castor oil (see "Chemical Technology and Analysis of Oils, Fats and Waxes," by Lewkowitsch, 6th edition, vol. 2, p. 406) produces relatively small modifications in certain important chemical indices, such as the iodine value, the acetyl value, and the saponification value. If drastic oxidation takes place, either by continued mild oxidation from the very beginning of the reaction, or as induced by either a higher temperature of reaction, or by the presence of a catalyst, such as alpha pinene, manganese ricinoleate, etc., then one obtains an oxidized oil having characteristics which clearly indicate that drastic oxidation has taken place. These indices of drastic oxidation are a relatively low iodine value, such as 65 or less, and may be as low as 40 or thereabouts; an acetyl value of approximately 160 to 200; an increased viscosity; a specific gravity of almost 1, or even a trifle over 1 at times; and in absence of other coloring matter, a deep orange to deep brown color.

Drastically oxidized castor oil can be prepared by well known methods, or such products can be purchased on the open market under various trade names, such as "blown castor oil," "bodied castor oil," "blended castor oil," "blended bodied castor oil," "processed castor oil," "oxidized castor oil," "heavy castor oil," "viscous castor oil," etc. These various names appear to be applied to drastically oxidized castor oils which are different in degree but not different in kind.

In preparing the demulsifying agent contemplated by our process, not only may blown oils be derived by direct oxidation of the various fats and oils, but also by direct oxidation of the fatty acids. Blown ricinoleic acid may be derived in the manner indicated in U. S. Patent No. 2,034,941, dated March 24, 1936, to De Groote, Keiser and Wirtel. It should be noted that blown oils in the broad generic sense herein employed include not only the products derived by oxidation, but also the products derived by polymerization. Reference is made to polymerized ricinoleic acid described in U. S. Patent No. 1,901,163, dated March 1, 1933, to Hinrichs. Reference is also made to polymerized castor oil or similar oils of the kind disclosed in co-pending application Serial No. 59,090, filed January 13, 1936, by Ivor M. Colbeth, now U. S. Patent No. 2,114,651. It might also be desirable to point out that the expression "blown oil," as herein used, contemplates blown unsaturated liquid waxes, such as blown sperm oil. It is understood that in the appended claims the expression "blown fatty oil" is used in its broad sense to include all the various materials, such as esterified blown fatty acids.

In such instances where blown or polymerized acids are used, in preparing the acylated aminoethers above referred to, it will become apparent that these materials must be converted into an ester before reaction with an amine, as subsequently described. For instance, blown castor oil fatty acids, or polymerized ricinoleic acid can be converted into the ethyl ester, methyl ester, propyl ester, cyclohexyl ester, ethylene glycol ester, glyceryl ester, or any suitable ester by means of conventional esterification processes.

A drastically oxidized castor oil of the above kind may, for example, have approximately the following characteristics:

| | |
|---|---|
| Acid number | 13.2 to 25.0 |
| Saponification number | 230.5 to 274.0 |
| Iodine number | 43.5 to 55.0 |
| Acetyl number | 164.0 to 192.0 |
| Hydroxyl value | 188.0 to 220.0 |
| Percent unsaponifiable matter | 1.1 |
| Percent nitrogen | 0.0 |
| Percent SO$_3$ | 0.0 |
| Percent ash | Trace |

Another variety of drastically oxidized castor oil which we prefer to use shows the following characteristics:

| | |
|---|---|
| Acid number | 6.3 to 8.7 |
| Saponification number | 202.5 to 223.0 |
| Iodine number | 60.8 to 63.0 |
| Acetyl number | 105.3 to 108.4 |
| Hydroxyl number | 114.4 to 118.0 |
| Percent unsaponifiable matter | 1.0 to 1.2 |
| Percent nitrogen | 0.0 |
| Percent SO$_3$ | 0.0 |
| Percent ash | 0.0 |

It is our preference to use blown oils, rather than blown fatty acids. We particularly prefer to use blown vegetable oils, such as blown cottonseed oil, blown corn oil, blown soyabean oil, blown rapeseed oil, and especially blown castor oil. Our preferred blown oil is a blown castor oil, which has been blown somewhat more drastically than indicated by the indices above recited, and which has been blown just short of the stage which produces semi-livery oils, as described in the aforementioned Stehr Patent No. 2,023,979.

The sulfonated fatty body employed is obtained by the action of sulfuric acid on a fatty acid or fatty oil. It is neutral, or slightly alkaline to methyl orange indicator. It contains only small amounts of water, commonly only about 4% or less. It may contain compounds of true fatty sulfonic acids, of fatty acid sulfates, or of sulfoaromatic fatty acids (the latter, in such cases where aromatic materials were present during sulfonation), or a mixture of these materials. These particular constituents of sulfonated fatty oils are, in the free state, dibasic acids, having a strongly acidic hydrogen atom present in an acidic sulfate or sulfonic group, as well as a weakly acidic hydrogen atom in the carboxyl group. When such compounds are neutralized to methyl orange indicator with any suitable base, like caustic soda, potassium hydroxide, ammonia, or triethanolamine, or the like, only the strongly acidic hydrogen atom is replaced. Further addition of the base results in replacing the carboxylic hydrogen atom. The salts, when these compounds are neutralized only to methyl orange, are known as acid salts. Our process contemplates the use of a mixture containing a sulfonated fatty acid or sulfonated fatty oil, which comprises solely such acid salts, in contradistinction to neutral salts, except to the extent that there might be a relatively slight over-neutralization. Sometimes the acid salts of these compounds decompose in time, when neutralized with ammonia, so that they may exhibit some acidity to methyl orange. This does not destroy the utility of the material as an ingredient in the reagent of our process but the acidity exhibited may result in an unfavorable corrosive action on metal surfaces with which the reagent comes in contact. The sulfonated fatty acid or the sulfonated fatty oil will also contain non-sulfo fatty materials, as is well understood in the art. The percentage of sulfur-containing acidic materials in sulfonated fatty bodies varies widely. We prefer to employ only those sulfonated fatty bodies that contain a minor proportion of sulfur-containing acidic materials, the sulfonated fatty ingredient of our reagent usually producing at best, only a poor water dispersion when tested in absence of the other ingredients of the reagent. Organically combined sulfur trioxide preferably does not exceed 6% of the sulfonated fatty matter on an anhydrous or active matter basis.

To produce our reagent the acylated product of a hydroxy amino ether, obtained as above stated, is mixed with a blown fatty oil, and with a sulfonated fatty body of the respective kinds described above. We have found that different proportions of these three kinds of ingredients in the mixture are required to be used to obtain optimum results on different petroleum emulsions. However, we do not claim the use of any ternary mixture of acylated amino ethers, blown fatty oils, and sulfonated fatty bodies. In all cases, considering the active matter of the reagent as 100%, there must be present at least 10% of each of the three active ingredients, which means that in no case can there be present more than 80% of any single ingredient in such active matter. Likewise, we have found that variations in the nature of the blown fatty oil affect the results to some degree. We prefer to employ a blown oil of the drastically oxidized type, similar to that described in U. S. Patent No. 2,023,979, to C. N. Stehr, in producing our reagent, but we have found broadly that such mixtures as have been described above are markedly useful in such demulsification processes. In addition to the active matter, the finished reagent may contain larger or smaller amounts of such inactive matter as solvents, diluents, etc.

The actual manufacture of the demulsifying agent herein contemplated consists simply in making a ternary mixture of the three components or ingredients comprising our reagent. Any suitable mixing device may be employed. Usually, it is convenient to dilute the demulsifying agent with a solvent of the kind hereinafter described. It is sometimes convenient to dilute any one or each of the ingredients with a predetermined amount of a selected solvent and to permit such solvent to remain as part of the final finished demulsifier.

In view of what has been said, it does not appear necessary to add anything to the description of the demulsifier, but purely for purposes of illustration, the following example of our preferred type will be described. We prepare a mixture of diamino and triamino materials which correspond essentially to either one of the two following type formulas:

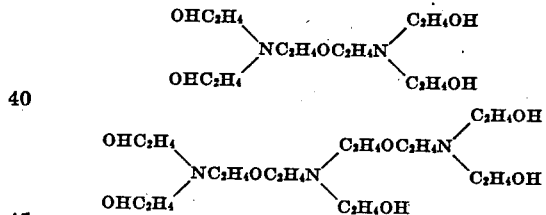

After determining the average molecular weight of such mixture, we combine the same with castor oil in the following proportion: 1 pound mole of castor oil for 3 pound moles of the mixed amines, "pound mole" in the latter case being calculated on the average molecular weight as determined. Such mixture is heated to approximately 160–260° for approximately 6 to 25 hours, until reaction is complete, as indicated by the disappearance of all of the triricinolein present in the castor oil. When the above mass is cooled down to approximately room temperature, it is admixed with an equal weight of blown castor oil of the kind previously indicated as representing the preferred type, and with an equal weight of a sulfonated castor oil of the kind described above.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents.

Similarly, the material or materials employed as the demulsifying agent of our process, may be admixed with one or more of the solvents customarily used in connection with conventional demulsifying agents. It has been previously pointed out that it is sometimes convenient to add a selected solvent, in predetermined amounts, to any one or to all of the ingredients which combine to form a ternary mixture constituting the active ingredient of the demulsifier herein contemplated.

Previously indicated as representing the preferred type, such mixture is stirred until uniform throughout. In some instances it is desirable to dilute the same, and our preference is to use a petroleum distillate in such amount that the finished product contains approximately 25% of such solvent by volume.

We have repeatedly demonstrated the effectiveness of our proposed reagent over any of the three ingredients used separately or used in pairs. We have, in certain instances, found that such simple ingredients or such binary mixtures are entirely ineffective to resolve petroleum emulsions in the field, whereas, our present reagent is capable of resolving such emulsions in widely separated oil fields and reducing the impurities in the crude oil to pipe line requirements.

It is well known that conventional demulsifying agents may be used in a water-soluble form, or in an oil-soluble form, or in a form exhibiting both oil and water solubility. The amino bodies referred to above are in general more inclined to be hydrophile in nature, while the blown oils are usually distinctly not hydrophile in nature. Sulfonated fatty bodies, referred to above, have already been stated to be usually only slightly water-dispersible. The solubility of a mixture of such ingredients may therefore be expected to vary from appreciable water-dispersibility to substantial water-insolubility. Our preferred type of reagent is not appreciably water-dispersible. Sometimes they may be used in a form which exhibits relatively limited oil-solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration range employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone, or in combination with other demulsifying procedure, such as the electrical dehydration process.

In the hereto attached claims, reference to the number of carbon atoms in the amino-ether radical contemplates the radical as such, without reference to any attached acyl or oxy-acyl radicals.

Having thus described our invention, what we claim as new and desire to secure by Letters Patent is:

1. A process for breaking petroleum emulsions of the water-in-oil type, characterized by subjecting the emulsion to the action of a demulsifying agent comprising a mixture of: (A) an acylated amino-ether containing: (a) a radical derived from a basic hydroxyamino-ether, and said radical being of the kind containing at least one amino nitrogen free from attached aryl and amido-linked acyl radicals; said hydroxyamino-ether radical being further characterized by the presence of at least one radical derived from a basic hydroxyamine and being attached by at least one ether linkage to at least one radical selected from the class consisting of glycerol radicals, polyglycerol radicals, polyglycol radicals, basic hydroxyamine radicals, amido hydroxyamine radicals, and aryl alkanolamine radicals; said basic hydroxyamino-ether radical being characterized by containing not over 60 carbon atoms; and (b) an acyl radical derived from a detergent-forming monocarboxy acid having at least 8 carbon atoms and not more than 32 carbon atoms; said acylated amino-ether being additionally characterized by the fact that said aforementioned acyl radical is a substituent for a hydrogen atom of an alcoholic hydroxyl radical; (B) a blow fatty oil; and (C) a sulfonated fatty body substantially neutral to methyl orange indicator; the proportions of A, B and C, respectively, constituting not less than 10% each and not more than 80% each of the total active matter of said reagent.

2. A process for breaking petroleum emulsions of the water-in-oil type, characterized by subjecting the emulsion to the action of a demulsifying agent comprising a mixture of: (A) an acylated amino-ether containing: (a) a radical derived from a basic hydroxyamino-ether, and said radical being of the kind containing at least one amino nitrogen free from attached aryl and amido-linked acyl radicals; said hydroxyamino-ether radical being further characterized by the presence of at least one radical derived from a basic hyroxyamine and being attached by at least one ether linkage to at least one radical selected from the class consisting of glycerol radicals, polyglycerol radicals, polyglycol radicals, basic hydroxyamine radicals, amido hydroxyamine radicals, and aryl alkanolamine radicals; said basic hydroxyamino-ether radical being characterized by containing not over 60 carbon atoms; and (b) an acyl radical derived from a detergent-forming monocarboxy acid having at least 8 carbon atoms and not more than 32 carbon atoms, said acylated amino-ether being additionally characterized by the fact that said aforementioned acyl radical is a substituent for a hydrogen atom of an alcoholic hydroxyl radical; (B) a blown unsaturated fatty oil; and (C) a sulfonated fatty body substantially neutral to methyl orange indicator;

the proportions of A, B and C, respectively, constituting not less than 10% each and not more than 80% each of the total active matter of said reagent.

3. A process for breaking petroleum emulsions of the water-in-oil type, characterized by subjecting the emulsion to the action of a demulsifying agent comprising a mixture of: (A) an acylated amino-ether containing: (a) a radical derived from a basic hydroxyamino-ether, and said radical being of the kind containing at least one amino nitrogen free from attached aryl and amido-linked acyl radicals; said hydroxyamino-ether radical being further characterized by the presence of at least one radical derived from a basic hydroxyamine and being attached by at least one ether linkage to at least one radical selected from the class consisting of glycerol radicals, polyglycerol radicals, polyglycol radicals, basic hydroxyamine radicals, amido hydroxyamine radicals, and aryl alkanolamine radicals; said basic hydroxyamino-ether radical being characterized by containing not over 60 carbon atoms; and (b) an acyl radical derived from a detergent-forming monocarboxy acid having at least 8 carbon atoms and not more than 32 carbon atoms, said acylated amino-ether being additionally characterized by the fact that said aforementioned acyl radical is a substituent for a hydrogen atom of an alcoholic hydroxyl radical; (B) a blown unsaturated vegetable oil; and (C) a sulfonated fatty body substantially neutral to methyl orange indicator; the proportions of A, B and C, respectively, constituting not less than 10% each and not more than 80% each of the total active matter of said reagent.

4. A process for breaking petroleum emulsions of the water-in-oil type, characterized by subjecting the emulsion to the action of a demulsifying agent comprising a mixture of: (A) an acylated amino-ether containing: (a) a radical derived from a basic hydroxyamino-ether, and said radical being of the kind containing at least one amino nitrogen free from attached aryl and amido-linked acyl radicals; said hydroxyamino-ether radical being further characterized by the presence of at least one radical derived from a basic hydroxamine and being attached by at least one ether linkage to at least one radical selected from the class consisting of glycerol radicals, polyglycerol radicals, polyglycol radicals, basic hydroxamine radicals, amido hydroxyamine radicals, and aryl alkanolamine radicals; said basic hydroxyamino-ether radical being characterized by containing not over 60 carbon atoms; and (b) an acyl radical derived from a detergent-forming monocarboxy acid having at least 8 carbon atoms and not more than 32 carbon atoms, said acylated amino-ether being additionally characterized by the fact that said aforementioned acyl radical is a substituent for a hydrogen atom of an alcoholic hydroxyl radical; (B) a blown castor oil; and (C) a sulfonated fatty body substantially neutral to methyl orange indicator; the proportions of A, B and C, respectively, constituting not less than 10% each and not more than 80% each of the total active matter of said reagent.

5. A process for breaking petroleum emulsions of the water-in-oil type, characterized by subjecting the emulsion to the action of a demulsifying agent comprising a mixture of: (A) an acylated amino-ether containing: (a) a radical derived from a basic hydroxyamino-ether, and said radical being of the kind containing at least one amino nitrogen free from attached aryl and amido-linked acyl radicals; said hydroxyamino-ether radical being further characterized by the presence of at least one radical derived from a basic hydroxyamine and being attached by at least one ether linkage to at least one radical selected from the class consisting of glycerol radicals, polyglycerol radicals, polyglycol radicals, basic hydroxyamine radicals, amido hydroxyamine radicals, and aryl alkanolamine radicals; said basic hydroxyamino-ether radical being characterized by containing not over 60 carbon atoms; and (b) an acyl radical derived from a detergent-forming monocarboxy acid having at least 8 carbon atoms and not more than 32 carbon atoms, said acylated amino-ether being additionally characterized by the fact that said aforementioned acyl radical is a substituent for a hydrogen atom of an alcoholic hydroxyl radical; (B) a blown castor oil; and (C) a sulfonated vegetable oil substantially neutral to methyl orange indicator; the proportions of A, B and C, respectively, constituting not less than 10% and not more than 80% each of the total active matter of said reagent.

6. A process for breaking petroleum emulsions of the water-in-oil type, characterized by subjecting the emulsion to the action of a demulsifying agent comprising a mixture of: (A) an acylated amino-ether containing: (a) a radical derived from a basic hydroxyamino-ether, and said radical being of the kind containing at least one amino nitrogen free from attached aryl and amido-linked acyl radicals; said hydroxyamino-ether radical being further characterized by the presence of at least one radical derived from a basic hydroxyamine and being attached by at least one ether linkage to at least one radical selected from the class consisting of glycerol radicals, polyglycerol radicals, polyglycol radicals, basic hydroxyamine radicals, amido hydroxyamine radicals, and aryl alkanolamine radicals; said basic hydroxyamino-ether radical being characterized by containing not over 60 carbon atoms; and (b) an acyl radical derived from a detergent-forming monocarboxy acid having at least 8 carbon atoms and not more than 32 carbon atoms, said acylated amino-ether being additionally characterized by the fact that said aforementioned acyl radical is a substituent for a hydrogen atom of an alcoholic hydroxyl radical; (B) a blown castor oil; and (C) a sulfonated castor oil substantially neutral to methyl orange indicator; the proportions of A, B and C, respectively, constituting not less than 10% each and not more than 80% each of the total active matter of said reagent.

7. A process for breaking petroleum emulsions of the water-in-oil type, characterized by subjecting the emulsion to the action of a demulsifying agent comprising a mixture of: (A) an acylated amino-ether containing: (a) a radical derived from a basic hydroxyamino-ether, and said radical being of the kind containing at least one amino nitrogen free from attached aryl and amido-linked acyl radicals; said hydroxyamino-ether radical being further characterized by the presence of at least one radical derived from a basic hydroxyamine and being attached by at least one ether linkage to at least one glycerol radical; said basic hydroxyamino-ether radical being characterized by containing not over 60 carbon atoms; and (b) an acyl radical derived from a detergent-forming monocarboxy acid having at least 8 carbon atoms and not more than 32 carbon atoms, said acylated amino-ether being additionally characterized by the fact that said aforementioned acyl radical is a substituent for a hydrogen atom of an alcoholic hydroxyl radical; (B) a blown castor oil; and (C) a sulfonated castor oil substantially neutral to methyl orange indicator, the proportions of A, B and C, respectively, constituting not less than 10% each and not more than 80% each of the total active matter of said reagent.

8. A process for breaking petroleum emulsions of the water-in-oil type, characterized by subjecting the emulsion to the action of a demulsifying agent comprising a mixture of: (A) an acylated amino-ether containing: (a) a radical derived from a basic hydroxyamino-ether, and said radical being of the kind containing at least one amino nitrogen free from attached aryl and amido-linked acyl radicals; said hydroxyamino-ether radical being further characterized by the presence of at least one radical derived from a basic hydroxyamine and being attached by at least one ether linkage to at least one polyglycerol radical; said basic hydroxyamino-ether radical being characterized by containing not over 60 carbon atoms; and (b) an acyl radical derived from a detergent-forming monocarboxy acid having at least 8 carbon atoms and not more than 32 carbon atoms, said acylated amino-ether being additionally characterized by the fact that said aforementioned acyl radical is a substituent for a hydrogen atom of an alcoholic hydroxyl radical; (B) a blown castor oil; and (C) a sulfonated castor oil substantially neutral to methyl orange indicator, the proportions of A, B and C, respectively, constituting not less than 10% each and not more than 80% each of the total active matter of said reagent.

9. A process for breaking petroleum emulsions of the water-in-oil type, characterized by subjecting the emulsion to the action of a demulsifying agent comprising a mixture of: (A) an acylated amino-ether containing: (a) a radical derived from a basic hydroxyamino-ether, and said radical being of the kind containing at least one amino nitrogen free from attached aryl and amido-linked acyl radicals; said hydroxyamino-ether radical being further characterized by the presence of at least one radical derived from a basic hydroxyamine and being attached by at least one ether linkage to at least one basic hydroxyamine radical; said basic hydroxyamino-ether radical being characterized by containing not over 60 carbon atoms; and (b) an acyl radical derived from a detergent-forming mono-carboxy acid having at least 8 carbon atoms and not more than 32 carbon atoms, said acylated amino-ether being additionally characterized by the fact that said aforementioned acyl radical is a substituent for a hydrogen atom of an alcoholic hydroxyl radical; (B) a blown castor oil; and (C) a sulfonated castor oil substantially neutral to methyl orange indicator, the proportions of A, B and C, respectively, constituting not less than 10% each and not more than 80% each of the total active matter of said reagent.

LOUIS T. MONSON.
WILLIAM WALLACE ANDERSON.

CERTIFICATE OF CORRECTION.

Patent No. 2,259,704.  October 21, 1941.

LOUIS T. MONSON, ET AL.

It is hereby certified that error appears in the printed specification of the above numbered patent requiring correction as follows: Page 2, first column, lines 66 and 67, in the formulas, for "$HC_2H_4$" read --$OHC_2H_4$--; line 72, for "$OHC_2H_4$" read --$OHC_2H_4$--; page 4, first column, line 12, for "aleic" read --oleic--; page 6, first column, line 22, after the formula, insert a quotation mark; page 9, second column, line 40, for "blow" read --blown--; and that the said Letters Patent should be read with this correction therein that the same may conform to the record of the case in the Patent Office.

Signed and sealed this 17th day of February, A. D. 1942.

Henry Van Arsdale,
Acting Commissioner of Patents.

(Seal)